Feb. 14, 1956     W. E. HORTON     2,734,701
AIRPLANE WITH RETRACTABLE VARIABLE-INCIDENCE WINGS
Filed May 13, 1952     2 Sheets-Sheet 1
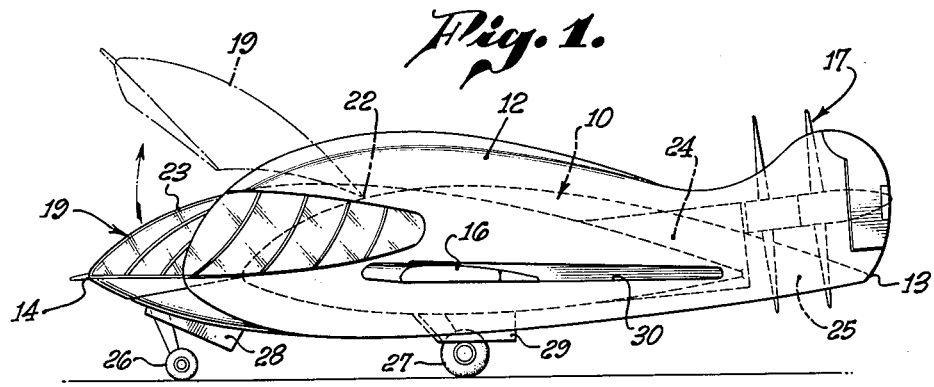
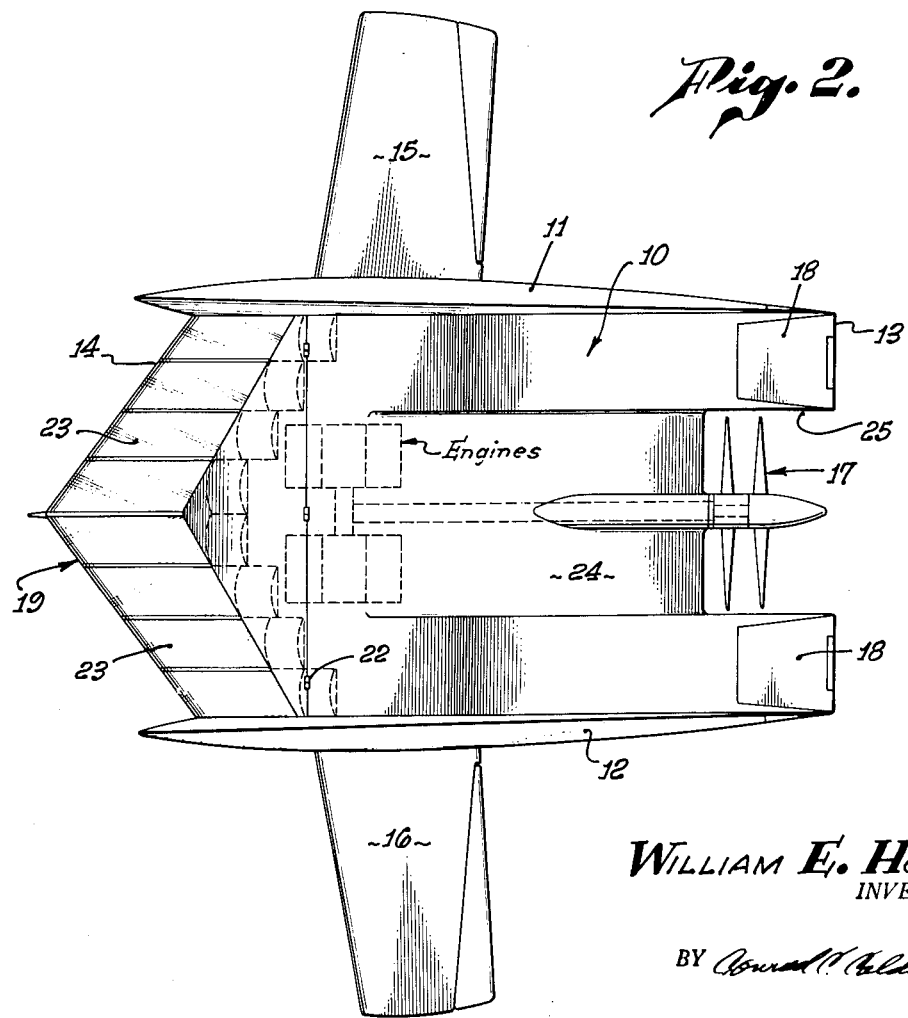
WILLIAM E. HORTON,
INVENTOR.
BY *Conrad N. Caldwell*
ATTORNEY.

Feb. 14, 1956      W. E. HORTON      2,734,701
AIRPLANE WITH RETRACTABLE VARIABLE-INCIDENCE WINGS
Filed May 13, 1952      2 Sheets-Sheet 2
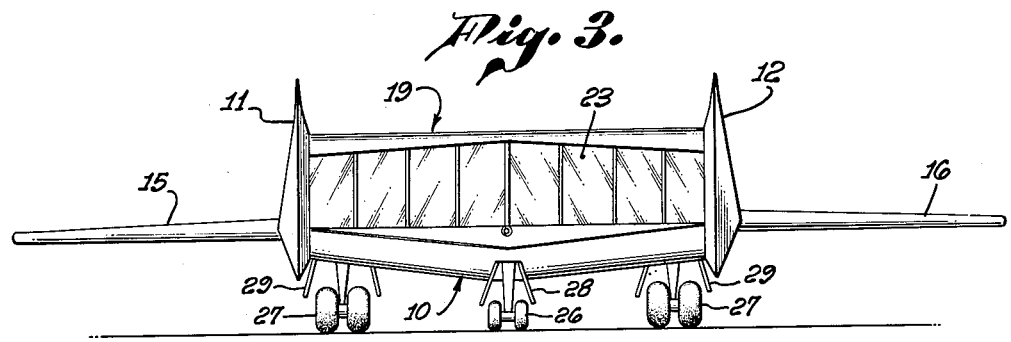
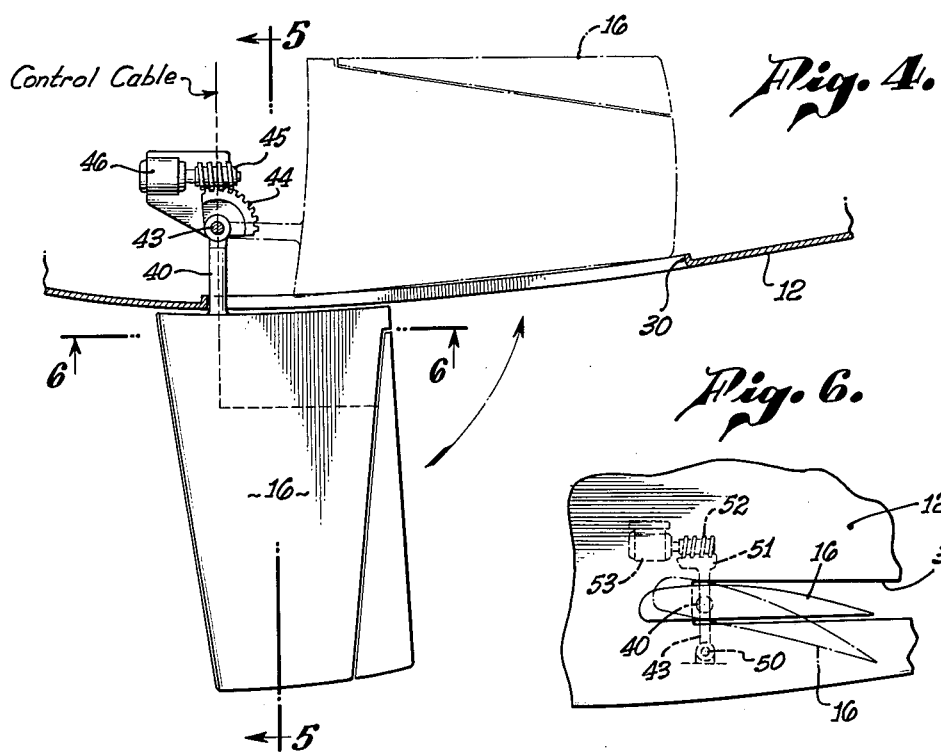
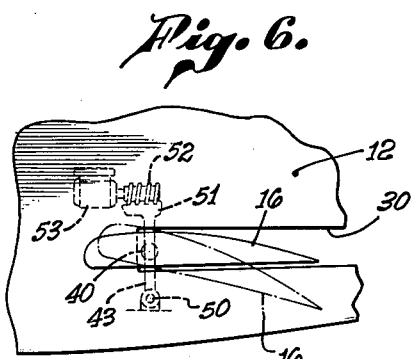
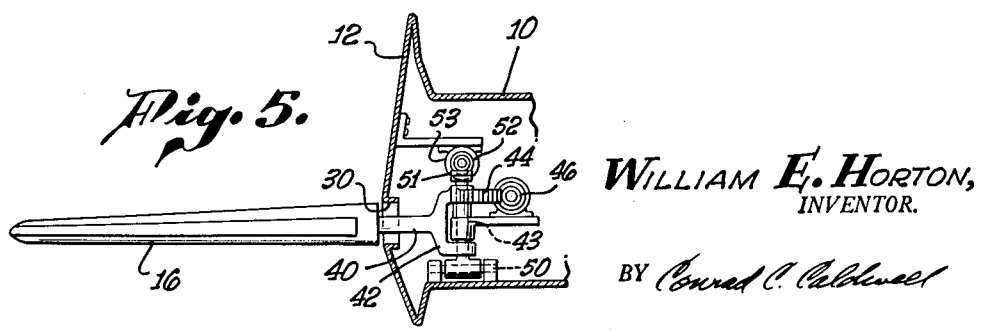
WILLIAM E. HORTON,
INVENTOR.
BY *Conrad C. Caldwell*
ATTORNEY.

2,734,701

AIRPLANE WITH RETRACTABLE VARIABLE-INCIDENCE WINGS

William E. Horton, Sunset Beach, Calif., assignor to Horton Aircraft Corporation, Sunset Beach, Calif., a corporation of California Application May 13, 1952, Serial No. 287,528

1 Claim. (Cl. 244—43)

My invention relates to roadable airplanes and has particular reference to a new and novel design of a heavier than air aircraft wherein the principal lift for airborne use is obtained from the shape and configuration of the body without the substantial use of wings.

It has been one of the endeavors of the aircraft industry for many years to produce a plane capable of utilizing a maximum of the interior space of the plane for cargo and passenger carrying and yet, at the same time, maintain overall outside dimensions at a minimum.

It is one of the objects of this invention to produce an airplane having a maximum carrying capacity and a minimum overall outside dimension whereby said aircraft can be used for ground service.

A great many attempts have been made to produce a roadable airplane; such endeavors have usually resulted in either detachable wings for ground use or awkward cumbersome mechanisms for folding the wings back against the sides of the plane. None of these attempts have been satisfactory.

It is a further object of my invention to produce a roadable airplane which embodies relatively short auxiliary wings for slow speeds, which may be folded or retracted into the fuselage to thereby result in a minimum outside dimension.

All previous attempts to produce an airplane having substantially no wings and depending upon the airfoil section of the fuselage have failed because of excessive spillage of pressure over the lateral edges of the fuselage.

The further object of my invention is to provide a substantially wingless airplane having pressure sealers along the lateral edges, but having relatively small retractable auxiliary wings in order to obtain stability of control at relatively slow landing speeds.

The use of the fuselage as the airfoil section to obtain sufficient lift to render the craft airborne, provides sufficient volume within the interior of the plane to result in substantial cargo or passenger capacity. When compared to the overall dimension of the craft, it can readily be seen to be of substantial value, particularly to military operations, where substantial numbers of combat troops can be carried in the interior of such aircraft and can be landed and transported over highways without the necessity of parachutes and like equipment. Such a vehicle would also add substantial mobility to the ground forces.

It will also readily be seen that this type of aircraft is considerably advantageous on board aircraft carriers, in that substantially all of the cargo and passenger carrying capacity can be parked closer together without the intervention of extensive wings, which serve no purpose insofar as cargo and passenger carrying is concerned.

Other and further objects and advantages will become apparent from the specifications and drawings related thereto.

On the drawings:

Figure 1 represents a side view of an airplane embodying the principle of my invention.

Figure 2 represents a top plan view of the airplane shown in Figure 1 and having the auxiliary wings extended.

Figure 3 is a front elevation of the airplane illustrated in Figure 1.

Figure 4 is a partial plan section, illustrating the control mechanism for retracting the auxiliary wings.

Figure 5 is a sectional view taken by line 5—5 of Figure 4.

Figure 6 is a sectional view taken on line 6—6 of Figure 4.

Referring more specifically to the drawings, the airplane illustrated in Figures 1 and 2 comprises, in its principal components, a fuselage 10, having lateral pressure sealers 11 and 12, extending from trailing edge 13 to slightly beyond the leading edge 14, and extending above the upper surface of auxiliary wings 15 and 16, pusher type propellers designated generally 17, control flaps 18 and an access door 19.

It will be noted from Figure 1 that the fuselage 10, has an upper surface, which forms an airfoil to thereby create sufficient lift to cause the plane to be airborne upon proper forward motion through the air.

The forward access door 19, is hinged to the fuselage 10 at 22 and is formed with its leading portion 23 of transparent material to permit observation of forward progress.

The fuselage 10 is also formed with a centrally depressed section 24, thereby forming a propeller well 25, to permit installation of the propeller at a point forward of the trailing edge 13, thereby protecting the propeller against physical damage in close formation stacking aboard aircraft carriers.

The plane is also provided with retractable landing wheels 26 and 27, which upon becoming airborne, may be retracted inside the fuselage 10, and covered by retractable doors 28 and 29 respectively.

The sides of the plane are formed with slots 30, to permit retraction of the wings 15 and 16 into the fuselage.

Referring to Figures 4 to 6 inclusive, I have illustrated in detail, the means for retracting the auxiliary wings.

The wing 16, is suported by a spar 40, which is formed with a yoke 42. The yoke 42 is supported by a shaft 43.

One arm of the yoke 42, is formed with a gear segment 44, which engages a worm drive 45. The worm drive being controlled by any suitable type rotary force such as the motor 46. It will readily be understood that the motor 46 can be electric, hydraulic or pneumatic. It will thus readily be be seen that rotation of the worm drive 45, will cause a rotation of the gear segment 44, to thereby cause the wing 16 to retract inwardly into the interior of the plane as indicated in Figure 4, in phantom.

The shaft 43 is pivotally mounted by means of a hinge pin 50 and is formed with a gear segment 51 at the upper end thereof.

A worm drive 52, meshes with said gear segment 51 and is controlled by a motor 53.

Operation of the motor 53, causes rotation of the worm drive 52 and pivoting of the shaft 43, about the hinge pin 50 to thereby change the angle of attack of the wing 16 as indicated in phantom in Figure 6.

Whereas, I have described one specific embodiment of my invention, what I conceive to be my invention, in its broadest aspects, is an airplane having an airfoil shaped fuselage to provide lift, sealers extending along the lateral edges of said fuselage to prevent pressure spillage and auxiliary wings which are retractable into the fuselage. It is my intention not to be limited by the specific description, above set forth, but to be extended the full range of equivalents of my invention as set forth in the following claim.

I claim:

An airplane comprising a fuselage and auxiliary retractable wings, said fuselage having upper, lower and side surfaces; the upper surface being convex to thereby create a low pressure area upon forward movement through the air; said side surfaces extending above said upper surface to prevent spillage of high pressure air into said low pressure area and being formed with horizontal slots; said auxiliary wings being operable to extended position and being retractable into said horizontal slots, said auxiliary wings being also rotatable about a horizontal axis perpendicular to the line of flight of said plane.

References Cited in the file of this patent

UNITED STATES PATENTS

| | | |
|---|---|---|
| 1,749,272 | Bird | Mar. 4, 1930 |
| 1,831,253 | Masi et al. | Nov. 10, 1931 |
| 1,893,129 | Charpentier | Jan. 3, 1933 |
| 2,058,803 | Klemperer et al. | Oct. 27, 1936 |
| 2,294,367 | Fleming | Sept. 1, 1942 |
| 2,410,239 | Roe | Oct. 29, 1946 |

OTHER REFERENCES

"Flight," publication Oct. 5, 1950 (vol. 58, page 377, Fig. 5).